United States Patent [19]

Marquardt

[11] 4,088,563
[45] * May 9, 1978

[54] PROCESS FOR THE TREATMENT OF WATER SOLUTION BY ION EXCHANGE

[75] Inventor: Kurt Marquardt, Holzgerlingen, Germany

[73] Assignee: Hager & Elsaesser, Vaihingen, Germany

[*] Notice: The portion of the term of this patent subsequent to Oct. 28, 1992, has been disclaimed.

[21] Appl. No.: 529,549

[22] Filed: Dec. 4, 1974

Related U.S. Application Data

[63] Continuation-in-part of Ser. No. 395,854, Sep. 10, 1973, Pat. No. 3,915,861, which is a continuation of Ser. No. 135,146, Apr. 19, 1971, abandoned.

[30] Foreign Application Priority Data

Jan. 19, 1971  Germany .............................. 2403274

[51] Int. Cl.² ...................... B01D 15/02; B01D 15/06
[52] U.S. Cl. .................................................. 210/33
[58] Field of Search ....................... 210/25, 30, 33–35, 210/189, 248, 268, 291–293

[56] References Cited

U.S. PATENT DOCUMENTS

| | | | |
|---|---|---|---|
| 2,422,054 | 6/1947 | Tiger | 210/25 |
| 2,767,140 | 10/1956 | Fitch | 210/33 |
| 3,019,079 | 11/1962 | Donohue | 210/33 |
| 3,193,498 | 7/1965 | Platzer et al. | 210/33 |
| 3,208,934 | 9/1965 | Kingsbury | 210/189 |
| 3,554,376 | 1/1970 | Kunz | 210/189 |
| 3,595,784 | 7/1971 | Butterworth | 210/33 |
| 3,619,425 | 11/1971 | Blain et al. | 210/33 |
| 3,775,310 | 11/1973 | Conway et al. | 210/33 |

FOREIGN PATENT DOCUMENTS

2,029,720  12/1971  Germany .............................. 210/33

*Primary Examiner*—Charles N. Hart
*Assistant Examiner*—Ivars Cintins
*Attorney, Agent, or Firm*—William A. Drucker

[57] ABSTRACT

Treatment of water solutions by means of ion exchange; the exchange mass through which the liquid under treatment flows is conducted from a bottom funnel of the treatment container to a regenerating-and-wash-column and then back to the liquid treatment container. After leaving the liquid treatment container and before entering the regenerating-and-wash-column the ion exchange masses are back-rinsed in a back-rinse container; the ion exchange mass is transported from the regenerating-and-wash-column by means of an immersion tube at the top of the regenerating-and-wash-column, the depth of immersion of the immersion tube being adjustable according to the volume in the bottom funnel of the treatment container; consequently the ion exchange mass in the head of the regenerating-and-wash-column which has been transported from the treatment container corresponds to the volume transported from the bottom funnel thereof.

1 Claim, 12 Drawing Figures

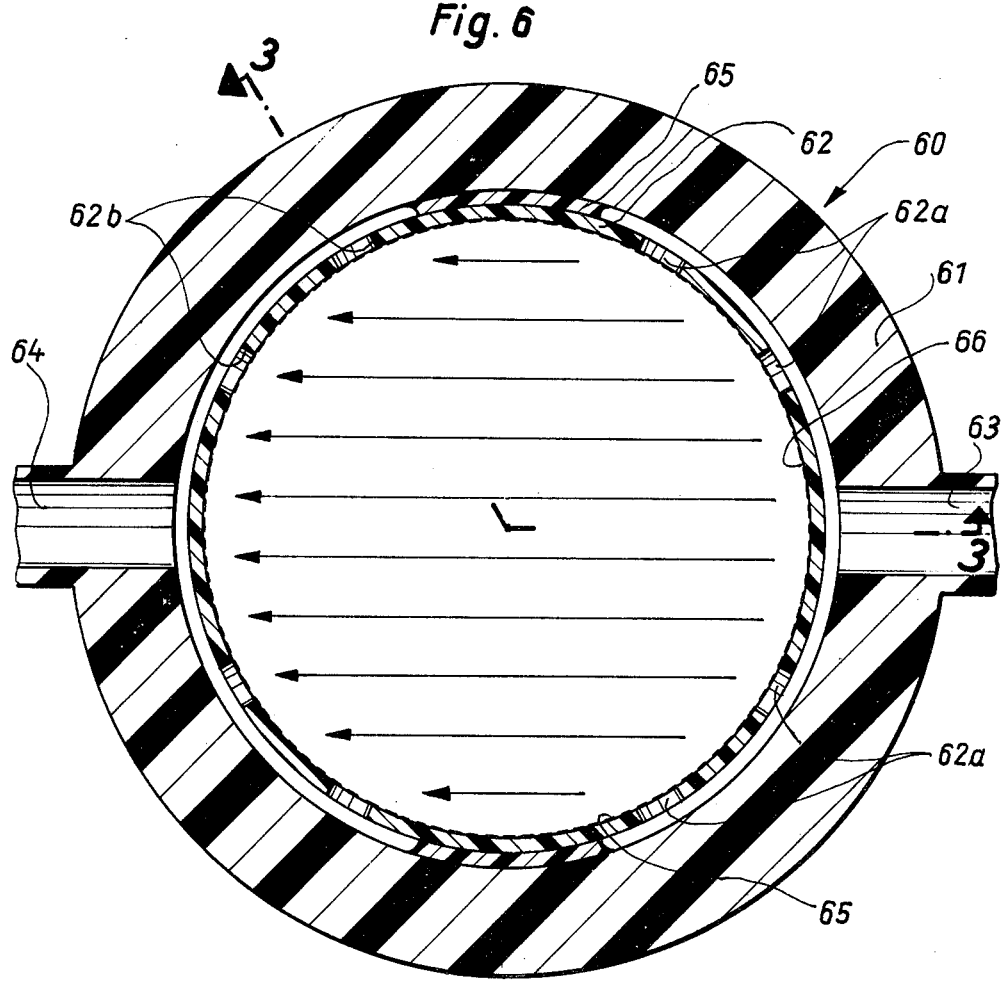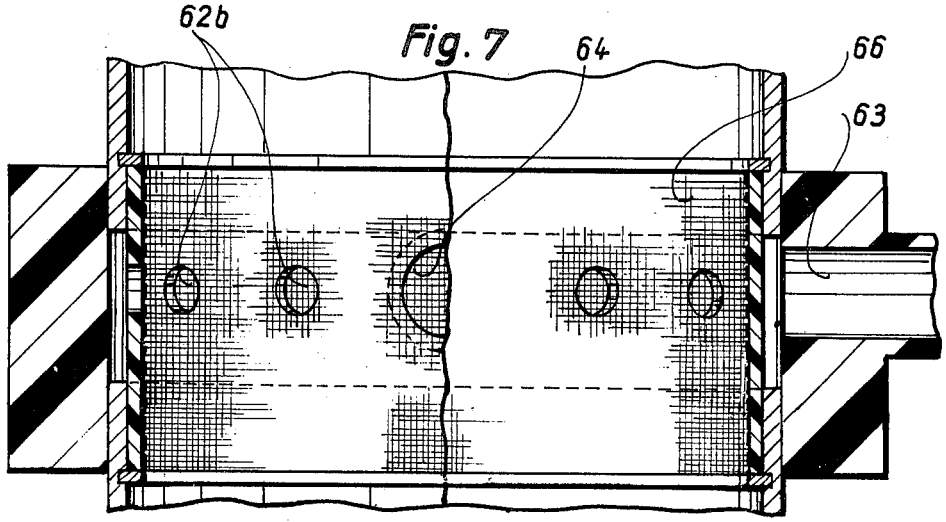

PROCESS FOR THE TREATMENT OF WATER SOLUTION BY ION EXCHANGE

This application is a continuation-in-part of my co-pending application Ser. No. 395,854 filed Sept. 10, 1973, now U.S. Pat. No. 3,915,861, which is a continuation of application Ser. No. 135,146 filed Apr. 19, 1971, now abandoned.

This invention relates to a method for the treatment of water solutions by means of ion exchanges and is a continuation-in-part application to U.S. patent application Ser. No. 395,854 (U.S. Pat. No. 3,915,861) filed Sept. 10, 1973. Such treatment may involve, for example, the preparation, softening, and/or the desalinating of such solutions. The ion exchange mass, through which the liquid to be treated flows, is conducted through a treatment container in which it contacts the liquid being treated, and thence to a regenerating-and-washing-column from which it is returned to the treatment container.

There are already known a number of different types of installations for carrying out the liquid treatment in a continuous or a quasi-continuous manner, wherein the necessary processes for operating the ion-exchange filters, such as exchange, rinsing-and-regenerating the ion exchange mass, etc. are not carried out in one tank, but successively in different apparatus within one cycle. These installations, in contrast to the operation of the so-called fixed-bed filters, wherein the back-rinsing, regenerating and washing of the ion-exchange mass is carried out after loading in the same, one tank, have the advantage that during the regeneration practically no interruption of the working cycle occurs. With classical procedures, on the other hand, it is necessary to insert a spare filter during the down-time of the main filter. This is not necessary with a constantly working circulating process wherein the process steps for the treatment of the water as well as the regeneration of loaded ion-exchange mass take place simultaneously.

A quasi-continuous process for operating ion-exchange filters has already been proposed, wherein the regenerating and washing of the exchange masses takes place in one tank. Specifically, the regeneration takes place in a lower part of a regenerating-and-washing-column, the pre-washing takes place in a middle part of such column, and the clear washing takes place in the upper part of the column. However, it has been found that with very dirty liquids such as a cleaning process in which the regenerating is also carried out in the same, one tank, such regneration is not sufficient. The resins are not sufficiently loosened, so that the particles and the dirt clinging to the resin will not be washed out thoroughly enough. Because of this, the resistance of the filter to liquid flow increases and the total efficiency of the construction progressively decreases.

Among the objects of the present invention is the creation of an economical process for the quasi-continuous treatment of liquids by ion-exchange masses, in a cycle wherein such ion exchange masses are conducted through a treatment container and a regenerating-and-washing-column. In accordance with the present invention the ion-exchange masses are thoroughly rinsed, and the process, in comparison to the traditional or classical processes, is carried out with little expense and with a greater security.

In accordance with the present invention, the ion-exchange masses leave the liquid treatment container through a bottom funnel, and before entering the regenerating-and-washing-column flow into a rinsing tank in which they are thoroughly re-rinsed at least once during each entire cycle. The removal of the ion-exchange masses from the rinsing tank and from the regenerating-and-washing-column is effected by means of headpieces carrying submerged tubes extending into the inner tank. The volume of the headpieces is determined with respect to the volume of the outlet funnel by varying the submerged depth of the immersion tubes as required. The ion-exchange masses located in the head of the tank and extending to the level of the submerged depth of the immersion tubes corresponds to one portion. As will be explained later on, it is possible with this process to treat very poluted liquids simply and thoroughly. The submerged or immersion tubes, in which the leaving and to be transported resin is introduced and taken off, respectively, as the transporting water is introduced via the head of the tank is inserted and drained, respectively, provide a simple determination of the portion of the resin to be transported as well as a simpler and surer transport of such resin. If the tanks are filled, water accumulates in the submerged pipes, so that at the introduction of the transport of resin there is first moved water which is mixed with the first exchange particles. Consequently, there will be predominantly water at the beginning of the transport, which will ensure a good transport security.

The installation of the invention works with great advantage under conditions in which the interval between the beginnings of successive working cycles, in which the ion exchange masses are taken off and transported (working time) is at least 8 minutes.

The apparatus of the invention can be used with the same advantages, without additional construction costs, in a mixed-bed type of installation. It is, consequently, not limited to applications in which the working tank contains only cation-exchange masses or anion-exchange masses. In such a case, according to the invention, by employing mixed-bed ion-exchange masses in the re-rinse tank there occur simultaneously in the tank a separation of the cation and the anion-exchange masses, which are taken off from the re-rinse tank separately and at different levels for washing and regenerating, and are transported into separate tanks and from there, after mixing, are returned to a mixed-bed treating tank.

To obtain a good degree of cleanliness of the liquid which has been treated and a total utilization of the regenerating means, in the apparatus of the invention it is provided that the regenerating means at the point of entrance thereof be provided with an impacting and diluting means which provides for a transverse water flow. To prevent a counter ion effect there is provided, for a successful continuation of the process, means whereby at the standstill of the pure water take-off the then-stored pure water overflows into the raw water storage tank, by way, for example, of the raw water conduit.

Advantageously apparatus according to the present invention can use a smaller number of lines than hitherto known. The more a plant is sub-divided into different lines, the less ion exchange capacity has to be kept in reserve for regeneration, but there are limits to this. The closer the duration of the exchange part of the cycles approaches the time required for regeneration the greater will be the number of lines, and so the probability of the regeneration of several lines or ion exchange units being concurrent will be increased. The result will be that the whole plant tends to get out of phase and will operate at lower than the planned capacity. Also, as the margin between the working and regeneration cycles is reduced, the plant operation is more sensitive to increases in the salt content of the raw water and the cycle time of the exchangers will be reduced. The relation between the operation of the exchange part of the cycle, the regeneration part and the number of lines is given by the formula $t_A = (n-1)t_R$ where $t_A$ is the duration of the working phase of the cycle, $n$ is the number of lines and $t_R$ is the time for regeneration. However, with continuous plants this disadvantage does not exist because the cycle time can easily be adjusted for a different salt content.

In spite of the advantages to be gained by the ion exchange system just described, neat separation of cation and anion resins is difficult. When a fraction of the cation resins are drawn off together with the anion resins, and vice versa, they are loaded in the respective regeneration process and return in this condition into the treatment container. The quality of the pure water is thereby impaired. The more the mixing ratio of cation and anion resins fluctuates in the transported charges, the wider is the mixing zone in the separation column and the greater is the difficulty of neat separation. The maximally achievable degree of purity of the de-ionate is largely determined by the degree of separation.

Apparatuses for desalinating liquids with the use of mixed bed ion exchangers have become known wherein the separation and the drainage of the ion exchanger masses takes place within the treatment container (German Auslegeschrift No. 1,767,623). For this purpose the filter container is partitioned into two chambers by a horizontal nozzle bottom each of which chambers contains a drainage system for discharge of the pure liquid. The nozzle bottom has a plurality of vertically disposed tubes of small diameter which serve for passing charged ion exchangers from the lower into the upper container chamber. In the chamber above the nozzle bottom there are arranged two suction sockets for separately discharging the loaded ion exchangers one of which sockets is fitted below the outlet apertures of the tubes for the purpose of discharging the ion exchanger of greater specific gravity and the other socket is fitted above the drainage system for the purpose of discharging the ion exchanger of lower specific gravity. Each suction socket is connected with a respective regeneration column for the respective ion exchanger. But by such an arrangement of structures built into the treatment column it is not possible to achieve a satisfactory degree of purity since by virtue of the continuous flow of the resin through the tubes of the nozzle bottom it is not possible to create a non-shifting fixed bed. The separation of the loaded exchanger resins takes place in the course of operating and the drainage is effected in the region of the pure water zones. Loaded exchanger resin is thus present at the outlet of the pure water so that a high degree of purity of the water cannot be achieved.

According to the invention this problem is solved in that the drainage pipes in the back-rinse and separation column are set at such a spacing from one another that the exchanger masses of each kind of resin which are situated between the mouths of the drainage pipes in the back-rinse and separation column amount to a multiple of the respective cyclically conveyed ion exchanger charges. Experiments have shown that if a "safety zone" is maintained between the drainage zones, then it is ensured that only a specific kind of resin is present in the region of the mouths of the drainage pipes, i.e. the anions in the upper region and the heavy cations in the lower region, so that a maximum guarantee for neat separation is provided. Since the weight differences between cations and anions are at least partly rather small, interposing a "safety zone" and the thereby resulting distance between the discharge mouths of the two pipes gives the best guarantee that only one kind of exchanger masses, i.e. cations or anions, will be present in the region of the mouths of the respective drainage pipe.

In order to be able to accurately and simply apportion the charge it is envisaged, according to the invention, to set the volume of the resin charge to be fed to the back-rinse and separation column in a proportioning or minimising column preceding the back-rinse and separation column. The capacity of the proportioning column advantageously corresponds to about one charge.

There is furthermore, contemplated according to the invention a post-washing of the reunited ion exchanger masses immediately prior to introduction into the treatment column, in order to ensure that totally purified mixed bed ion exchanger masses pass into the treatment container. This post-washing can be of particular advantage when the ion exchange installation is used as a policing filter for post-desalinating pre-desalinated water or in the processing of water having a low salt content, industrial condensate or turbine condensate, optionally after passage through a reverse osmosis installation or a fully desalinating installation.

Further advantages and characteristics of the invention will become apparent from the following description and the accompanying drawings, wherein there are shown several embodiments of the apparatus in accordance with the invention.

In the drawings:

FIG. 6 is a view in horizontal cross-section through the flange piece disposed between the regenerating and the washing zones of the regeneration-and-wash-column;

FIG. 7 is a view in vertical cross-section through the flange piece, the section being taken along the broken section line 7—7 of FIG. 6;

Figure 1:
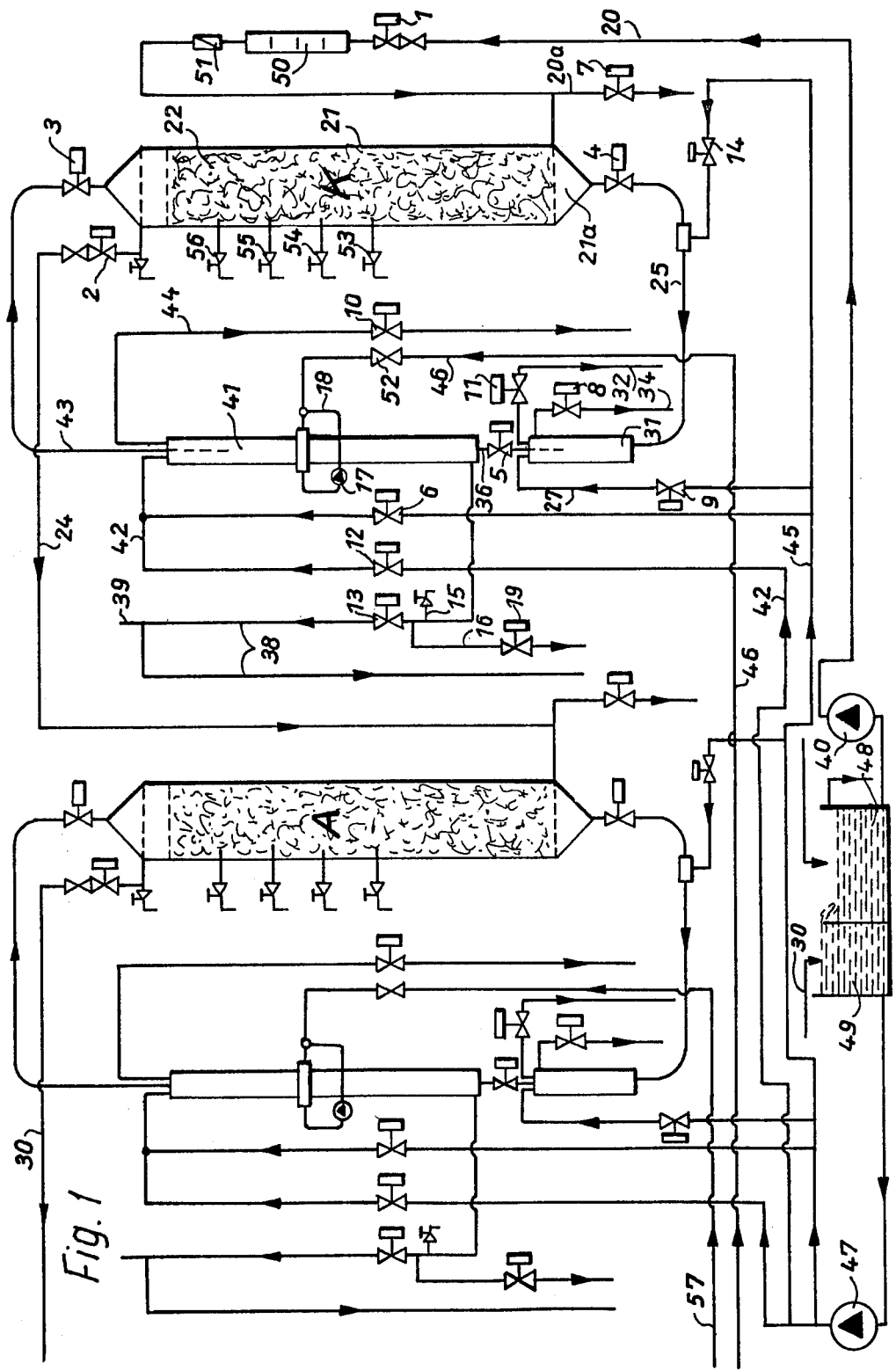
FIG. 1 is a circuit diagram of a quasi-continuous working full desalination plant according to the invention, comprising by way of example a two-stage plant.

In the schematically represented circuit of FIG. 1 there is shown a quasi-continuous working installation for treatment of liquid agents. To simplify matters, the following description is that of the treatment of water.

The circuit shown is a two-stage installation in which the water to be treated flows through two treatment or operating containers, one designated K, which is a treatment-container 21 holding cations, the second stage, at the left, being a treatment-container A filled with anions. The two stages are exactly the same; the following description is mainly concerned with the right hand part of the installation as shown in FIG. 1, in which the cation-exchanger is located.

The untreated water is fed by means of pump 40 from an untreated water container 48 via a conduit 20 into the bottom of the treatment container 21. The throughflow, which is indicated by means of a flow through volume meter 50, which is located in front of a back-shock-valve 51, is regulated by means of a valve 1 disposed in the conduit 20. There is present in the container 21 ion-exchange mass 22 through which untreated water flows in a direction from the bottom to the top of the container. The clean water leaves container 21 by means of a valve 2 which adjusts the rate of flow of the liquid through the discharge conduit 24. Immediately in advance of the entrance to container 21 there is provided a branch 20a with a valve 7 in the untreated water conduit 20.

At the bottom of container 21 there is a funnel-shaped collecting chamber 21a which is connected by means of a conduit 25 provided with a valve 4 with a return-rinse container 31. Connected to this conduit 25 through a valve 14 is another conduit 45 which feeds transport-and-return-rinse water from a clean water container 49 by means of a pump 47. A conduit 27, in which there is interposed a valve 9, is branched off conduit 45 and leads to the upper end of the return-rinse-container 31. A rinse conduit 32 is also connected to the top of the return-rinse container 31, conduit 32 having an adjustable valve 11 interposed therein. A dirty water tube 34, which is selectively sealable by a valve 8, is connected to the container 31 somewhat below the top thereof. The bottom of the regenerating container 41 is connected to the top of the return rinse container 31 by means of a conduit 36 in which there is interposed a controllable valve 5. The regenerating agent is introduced through a conduit 46 and a valve 52, conduit 46 being attached to the middle part of the column 41 as shown. A circulating tube and pump 17 is provided in this region, the pump being connected in a loop composed of conduit portions 64, 18, and 63. See FIGS. 6 and 7 as to the location of the conduit portions 63, 64.

To the bottom of column 41 there is attached a drain tube 38 having a valve 13 interposed therein. The drain tube 38 has a ventilation conduit 39 secured thereto. In advance of the valve 13 there is provided a tap 15 and also the branch of a drain tube 16 provided with a valve 19. Diluting water is fed over the head of the column 41 by way of a tube 42 having a then adjustable valve 12 therein, the conduit 45 being connected to conduit 42 through a valve 6. To the upper region of column 41 there is attached a transmission tube 43 having an adjustable valve 3 interposed therein, and a further, drain tube 44 which is adjustable by means of a valve 10, the conduit or tube 43 leading to the top of the treating container 21 through the valve 3. Connected to the container 21 at different levels there are a plurality of taps 53–56, inclusive, for taking offwater samples to measure the output capacity of the installation.

The above-described installation operates in the following manner:

As stated above, the installation is quasi-continuously working, the feeding or transport of the ion-exchange masses taking place cyclicly. Such masses may be fed constantly by means of a time-relay which operates at intervals, or it may operate at discontinuous intervals if the interruption time is controlled by a measured value, for example, when a definite value of conduction capacity is reached, which is dependent on the degree of exhaustion of the ion exchange masses in the containers A and K. The water-conducting valve 6 is opened in order to feed freshly-regenerated ion-exchange resins from the washing-and-regenerating-column 41 into the top of the treating container 21 through the conduit 43 and the valve 3. In such operation the valve 2 will have been closed, the untreated water conduit 20 will have been closed by shutting valve 1, and valve 7 in conduit 20a will have been opened so as to drain the untreated water in container 21 into a reservoir (not shown) for re-use.

After a short interruption, in order to accomplish the described feeding of the ion-exchange mass, the valve 1 in the untreated water conduit 20 and the valve 2 in the clean-water conduit 24 are re-opened. In the next cycle, the loaded ion-exchange masses 22 which are located in the drain funnel 21a of the container 21 are, by brief openings of valves 4 and 11, fed through the conduit 25 into the back-rinse container 31. After this, valve 14 is opened for supplying transport and return-rinse water to the container 31. A portion of the resin still present in the return-rinse container 31 is conducted, with valves 5, 9, and 10 open, into the washing-and-regenerating-column 41.

After this, the return-rinse action in the return-rinse container 31 takes place. The rinse water is led into the bottom of such container through valve 14 and conduit 25, while the dirty water is drained through conduit 34 and open valve 8. At this time the valves 9 and 11 are closed. Simultaneously with the regeneration of back-rinse water the ion-exchange masses located in the washing-and-regenerating-column 41 will be regenerated. The regenerating agent is fed into column 41 through open valve 52 and is led over back-washed resin located in container 31, while diluted water is being conducted through tube 42 and open valve 12 into the top of the regenerator container 41. The used regenerating agent is drained from container 41 through tube 38 and opened valve 13. The drainage of transporting water is effected through tube 44 and opened valve 10 during the influx of the backflow of ion-exchange portions into the container 41.

The clean water flowing from the top of container 21 through conduit 24 is fed to anion container A and leaves the latter through clean-water tube 30. Lye for regenerating the ions is fed through a conduit 57 to the regenerating container at the left in FIG. 1. The operation of the above-described process will be better understood upon consideration of FIGS. 2–5, inclusive. In such figures the same parts are designated with the same reference characters as those employed in FIG. 1. In FIGS. 2–5, inclusive, there is shown a treatment container 21, a backflow rinse container 31, and a regenerating-and-washing-column 41. In order to provide a greater length of column 41, as shown in FIGS. 2–5, inclusive, such column is of U-shape. As a result of such construction, much space is saved.

As shown in FIGS. 2–5, inclusive, the ion-exchange masses are drained from container 31 and 41 by means of immersion tubes 23 and 33 respectively, such tubes being submerged in the container headpieces to a depth such that just one resin portion can be drained in one cycle of the operation of the installation. In this manner, there is always possible a simple determination of the transported resin, which is that amount in the head of the column which can be drained through the tube up to the level of immersion of the tube. The resin portion formed by the depth of immersion of the tubes 23 and 33 corresponds to that amount in the drain funnel 21a of container 21. These volumes must be co-ordinated.

The use of the immersion tubes 23 and 33 has, apart from the simple determination of the resin portion to be forwarded, the additional essential advantage in comparison with all of the other well known methods of this kind; the forwarding of the resin portions is interrupted only by the time interval of the opening and closing times of the valve. When a minor water push follows the transport or feeding of the resin, the feeding conduits are rinsed clean and no residue of resin will be present in the tubes and valves. In this manner, the wearing of the valves and the wasting of resin are avoided.

Figure 2:
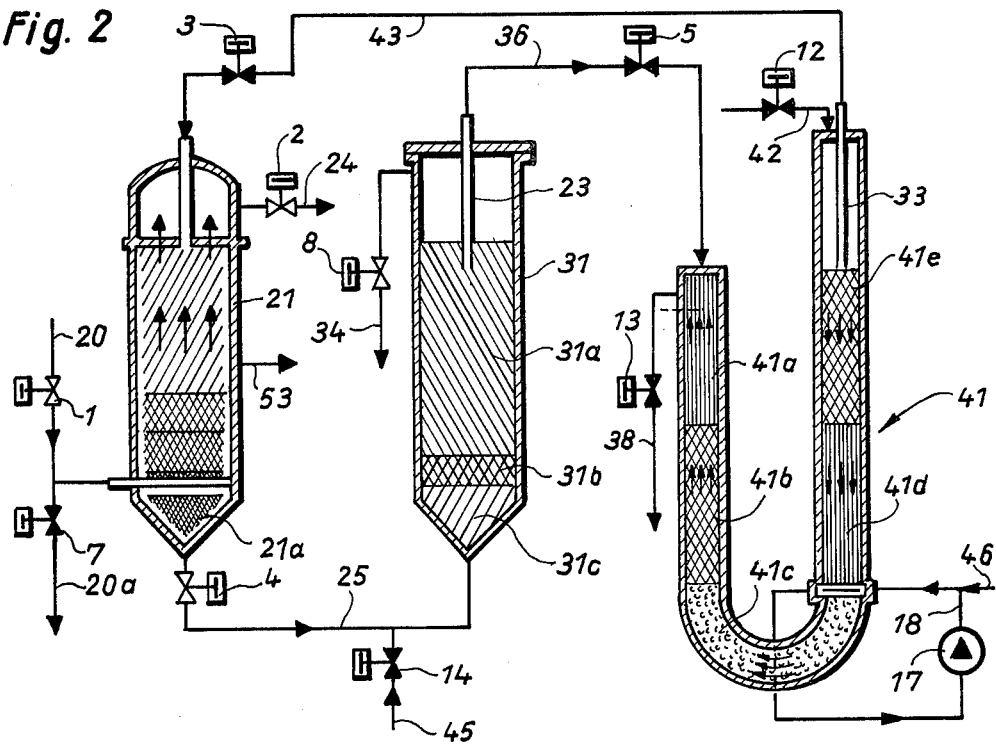
FIGS. 2, 3, 4 and 5 are schematic reproductions of a part of the plant, such figures demonstrating the process in different stages of the desalination process.

Referring to FIG. 2, in general there are three process steps in the treatment column, the water treatment, fresh ion exchange resin supply with forced rinsing and the removal of the resin while the water purification is going on. Raw water is supplied at the bottom of the column 21 and flows towards the top through the compact resin bed which, depending on the flow rate, behaves to more than 90% as a fixed bed. The treated water leaves the top of the column and goes to a Carbon Dioxide spray degaser, the next ion exchange stage, or a pure water reservoir. The lower layers of the ion exchanger resin will become saturated with cations or anions in an order determined by their valency. The degree of saturation in the various layers of the bed is determined by taking sample streams at various bed heights. The removal of saturated resin is controlled on the basis of the conductivity; sodium ion concentration and PH values in the sample streams. The plant cycle is switched only when the pre-set upper limit of saturation of the resin is reached, the raw water supply being shut off for 30–90 seconds.

In order to prevent mixing within the resin bed, a forced rinse system is used at the start of a cycle to push the resin from the top distributor plate and towards the bottom of the column. When the raw water is shut off, the pressure drop ceases to hold up the bed and the saturated resin falls into the conical space or drain funnel 21a at the bottom of the column 21 which is designed to be large enough to hold it. At the same time as the saturated resin is forced into the funnel 21a, another volume of freshly regenerated resin is supplied from the regeneration column 41. Since the saturated resin is now below the water inlet and the column recharged with fresh resin, the valve at the bottom of the column 21 is opened and the back pressure of the raw water causes the resin to be carried into the backwash column 31 until the bottom of the treatment column is again empty. In this way, as is the case for all resin transfer lines, the valve only shuts against water and not resin granules. Also, because no resin is left in the transfer lines when the valves are closed, the granules cannot settle out and block the lines.

In FIG. 2 there is illustrated a condition wherein there occurs such a forwarding of the ion-exchange mass from container 21 through conduit 25, with valve 4 open, into the back-rinse container 31. In such figure the valves which are open are illustrated with an outline only whereas the valves that are closed are shown fully linked-in. A part of the partially drawn resin is already in the lower funnel part 31c of the back-rinse container 31, while a further, already used, resin portion 31a is settled over a mixing zone 31b. In order to obtain a thorough rinsing of the resin, the volume of container 31 is calculated to be able to contain at least two resin portions.

In this back-rinse container 31, the resin is backwashed and subsequently transferred to the regeneration column 41. During the backwash step there is one charge in the column. Abraded resin fines are removed from the saturated resin. If necessary, at the end of the backwash cycle fungicides could be put in the column to sterilise the resin.

The next charge of saturated resin pushes the washed resin charge to the top of the back-rinse container where there is an immersion tube 23 which is designated to reach to the bottom of the rinsed charge. The pressure of the pure water used for backwashing is sufficient to force the rinse charge into the regeneration column 41, and when this is complete, backwashing of the new charge starts. By careful design of the size of the bottom of the treatment container and depth of the immersion tube, the use of expensive level measuring instruments and photo-electric cells, which could fail, can be avoided.

During the back-rinse process, the washing-and-regenerating process takes place in the washing-and-regenerating-column 41 in different zones thereof which are marked accordingly. A regenerating agent such as hydrochloric acid or caustic soda is fed through conduit 46 in the middle region of column 41, and the resin introduced through conduit 36 is regenerated in the countercurrent. In this way there are obtained three zones corresponding to the time of stay of the resins during three working cycles. In the region 41a, in which the resin is in contact with the used regenerating agent, there takes place a preregneration. In region 41b regeneration takes place; in region 41c the resin is in contact with the concentrated, unused regenerating agent. In order to achieve a uniform regeneration at the influx, a constant circulation is provided by a conduit 46 to which the conduit 18 is connected, the pump 17, described in detail in connection with FIGS. 6 and 7, and the conduit 64. In the region 41d, 41e and 41f the newly-regenerated resin is washed. The wash and diluting water is fed in through conduit 42. The water flowing through resin portion 41e (in the wash zone) which is still rather relatively clean, prewashes the resin in region 41d. In the regenerating zones this water simultaneously serves as diluting water, so that an optimal use of the water is possible, which has favorable effects on the water consumption and the volume of water to be drained. The water entering zone 41e from zone 41d still contains an excess of regenerating agent, which, together with the regenerating agent fed, are used completely, so that consumption of regenerating agent is very small.

Figure 3:
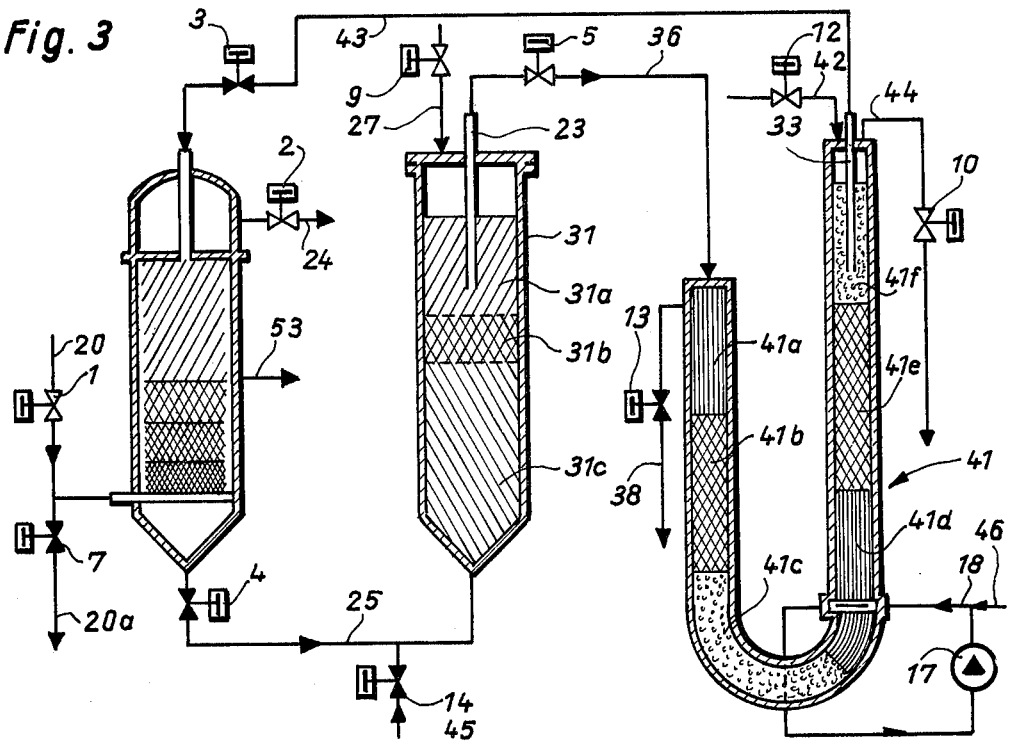

In FIG. 3 there is shown the same portion of the installation as in FIG. 2 but in a later part of the operating cycle. Resin is being transported from back-rinse container 31 through open valve 5 to the washing-and-regenerating-column 41. A part of the washed resin 31a has already been drained and is located in region 41a. In the region of the clean wash zone 41f there has now occurred an accumulation of a resin portion. The displacing water is being drained through open valve 10 to the untreated water container 48.

Figure 4:
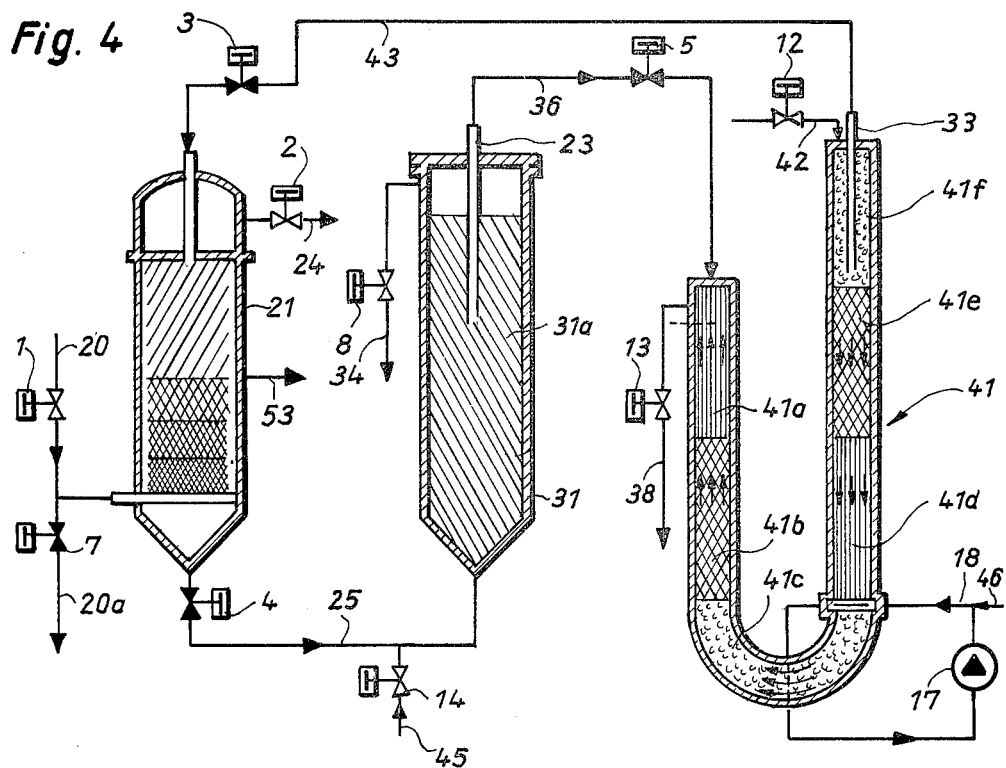

FIG. 4 shows the portion of the installation shown in FIGS. 2 and 3, but in the condition of back-rinsing.

With valve 14 open, wash water is conducted through conduit 25, while the used rinsing water is being drained through conduit 34 in which the valve 8 is open. There is only one portion of resin 31a present in the back-rinse container 31, which is being loosened by the back-rinse and thus practically takes up the whole volume of the container. There are 6 portions present in 6 zones in the washing-and-regenerating-column 41, namely, in the three regenerating zones mentioned above as well as in the clean wash zone 41f, the wash zone 41e, and the pre-wash zone 41d. Regenerating agent is fed into the region 41c, and, after passing through the preregenerator zones 41d and 41a is drained through conduit 38 and open valve 13, while wash water is led in through conduit 42.

Figure 5:
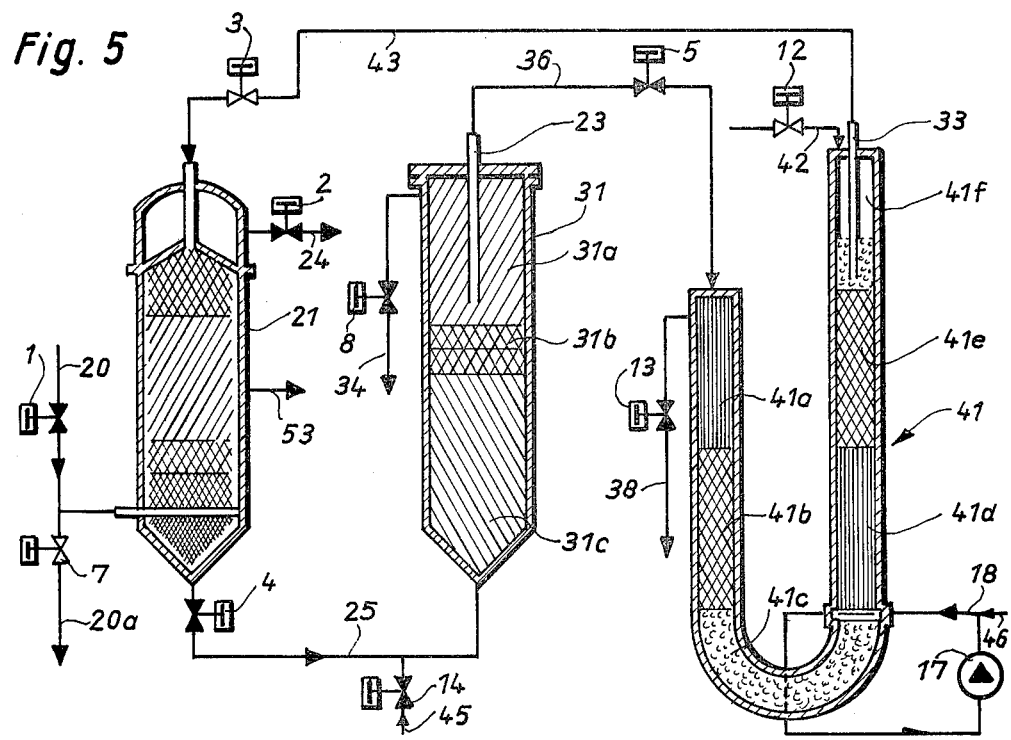

In FIG. 5 there is illustrated the flowing of resin from the washing-and-regenerating-column 41 to the container 21 through conduit 43 and open valve 3. Through conduit 42 and open valve 12 transporting water is being fed in, such water causing the resin to be drained through immersion tube or conduit 33. If, due to variations in the take-off of treated water or in the raw water salt composition, after the normal cycle time of 12–20 minutes transfer of resin is not necessary, the regeneration liquors are automatically shut off. Also, for economy reasons, the wash water flow is reduced to a trickle until the next cycle starts. This low flow rate is just sufficient to prevent counter ion effects. With the inflowing of the resin portion through the head of container 21, part of the used resin sinks to the drain funnel 21a (See FIG. 1). The untreated water supply is blocked by the closing of valve 1, and the operation is interrupted during this short phase. The raw water in container 21 is drained through open valve 7 in conduit 20a.

As shown in FIG. 5, the upper level in container 21 is not even, but is conically shaped. This results in the first advantage, that the free filter surface is increased, which is very advantageous at great speeds of flow in view of the self-resistance. A second advantage is that, likewise as shown in FIG. 5, a uniform distribution of the ion-exchange material is obtained in the operating column 21.

The different zones shown in container 21 show different grades of loading of the resin. The most strongly bonded ions, for example, Cu, Ni, Cr, Al, etc. settle in the lowest zone in the region of the untreated-water inlet, while in the second zone, for instance Na, K, NH$_4$, Ag, etc. will be found and in the third zone there will be found, for example, Na. As the heavily loaded, lowest layer is drained immediately to the back-rinsing-and-regenerating-column 31 through conduit 25, the attack by strongly oxidizing substances on the ion-exchange resins will not be so disadvantageous as with the usual processes with ion-exchange columns. This follows because these substances in the following back-rinse-regenerating-exchange process are immediately again exchanged. Tensides (surface active substances) are mainly taken from the lowest layers of the resins in the operating container 21 and are immediately expelled on the next cycle. The dangerous ageing of tensides of ion-exchange substances is therefore avoided.

The degree of cleanliness of samples taken from the various taps 53–56, inclusive (FIG. 1), is dependent upon the degree of loading of the resin. As soon as a proposed value of cleanliness is attained, the cycle is terminated and the resin is automatically forwarded as above-described. The installation is designed for a minimal cycle time of 8 minutes. With decreasing salt content of the water, the loading zone in the operating container 21 travels downwardly, whereby the cycle not only exceeds 15 minutes, but, for example, will consume as much as 20 to 30 minutes or even more.

If no water is taken from the pipe 30 by a consumer, the clean water will be passed into the clean-water container 49 which is combined with the untreated water container 48. The clean water then flows from reservoir 49 into untreated-water reservoir 48 and from there passes through the untreated-water conduit 20 to the operating and treatment container 21. Since during this time there is no flow of water from the wash column 41 through the treatment column 21, the run-off from the regenerating column 41, which is not now loaded with salts, is conducted via the conduit 38 to the raw-water container 48 after reaching the predetermined degree of cleanliness which is determined through the taking of samples at the tap 15. This constant turnover is advantageous to avoid a counter-ion-effect as well as to avoid a loss of ions from the container 21.

The wash and back-wash water drained from the tubes 20a, 32 and 16 will be fed to raw water container 48, while the forwarding waters, for example, from conduit 44, will be returned to the circulation, namely in back-rinse-water-wash container 31 or in the regenerator-and-wash-column 41. The used water from conduit 38 is employed only as diluting water for the regeneration of the chemicals. Desalinated water from the clean-water container 49 is used entirely for the forwarding of resin. The washing water is used three times in the regenerator-and-wash-column 41, namely to clean-wash, to wash and to pre-wash, and afterwards to be used as a diluent in the regenerating process. Because of this, the amount of water needed in the process can be quite limited, which is an economic advantage. The water consumption in this installation is considerably less than that in other conventional installations having ion-exchange columns. The same is true for the necessary supply of ion-exchange materials, which are lower in this process than in other known installations.

Because of the thorough washing of resin in the back-rinse container 31 before the regeneration step, all types of mechanical pollution are avoided. Any finely-divided particles produced by the forwarding of the resin will be rinsed out. Water entering the system may be dosed with a suitable disinfectant material, for example, at the back-rinse container 31, so as to produce disinfection of the resin.

The resin portion forwarded in one cycle of operation of the installation corresponds at a maximum to about 1/12 of the total volume of the ion-exchange material in the operating column 21. For the regeneration and washing process there are required the following approximate times:

(a) with a cycle of 20 minutes in the washing-and-regenerating-column — every 60 min.

(b) with a cycle of 15 minutes in the washing-and-regenerating-column — every 45 min.

An increase in the cycle volume in the wash as well as the regenerating zone leads to a predictable, increase in the efficiency of the process and a decrease in water consumption.

The switching cycle for the transport of ion-exchange resin can be controlled on the basis of time by the quantity of pure water produced or, in the optinum way, from the degree of purity of the treated water or degree of saturation in the resin in the treatment column. The plant may be laid out on a basic time cycle of 12–20 minutes for the maximum estimated salt content of the raw water. If the salt content is lower than this value because of changes in raw water quality or changes in the rate of take-off of treated water, the saturation zone in the treatment column climbs more slowly. The cycle time is then prolonged until the concentration of ions in the sample stream, usually from the middle of the bed but depending on the resin type, depends on the raw water composition, and particularly on the ratios of the various ions to one another and the rate of saturation. As this criteria cannot be precisely determined beforehand, take-off points are provided at various bed heights. In this way, the treatment column bed can be saturated to a certain height with the rest of the bed serving as a safety zone. Therefore, a polishing zone can be considered to exist, filled with freshly regenerated and thoroughly washed resin, which is of particular value when shutting down or restarting the plant. When the plant is out of service, the counter ion effect occurs in the saturated part of the resin bed; because this part is relatively small, always restricted to a definite height in the column and has the clean resin on top of it the effect of ion migration is much rendered. When a plant is started up after being out of service, pure water of adequate quality can be obtained within a few minutes.

In order to compensate for the variations in the take-off rate of treated water between zero and the maximum flow, the overflow from the de-ionised water reservoir is connected with the raw water reservoir in such a way that no raw water can mix with the pure water. If very little or no demineralised water is taken off, the clean water flows into the raw water reservoir to reduce its salt content. As a result, the saturation zone in the treatment container climbs more slowly and the cycle time is lengthened. If a conventional mixed bed column is needed this can be installed after the de-ionised water reservoir. Neutralisation of the regeneration effluent is very simple since it flows continuously at a low rate as a combination of both the acid and alkali streams. The usual large collection and mixing basins are no longer necessary, and often the acid and alkali are in the right proportions to neutralise each other. Because the flow is continuous any neutralisation can be carried out directly in the pipe line, and is much easier to automate.

These plants can be fully automated at relatively low cost because in the main the valves serve only for charging and discharging the ion exchange resin. Only in the main inlet and outlet lines are process control valves necessary. A very simple, and therefore reliable, control system in the form of 19 inch rack mounted bins is used. It requires only 6 to 8 counters for independent adjustment of the exchange, backwash, regeneration and transfer steps. If the automatic controller fails the plant can be operated manually using a switching schedule since the few operating steps are functionally interlocked with one another. In any case, the cost of keeping a spare bin in stock is small. The quantity of resin to be transferred may be a function of throughput and salt content for 3 basic cycle times. A plant based on 20 minutes cycle time has a large margin for an increase in the salt content of the raw water. For example, for a salt content of 5 meq/l, a throughput of 30 m$^3$/hr and a cycle time of 20 minutes the quantity of resin to be transferred is 150 l/hr or 50 l/charge. The backwash time would be 15–17 minutes and the regeneration and rinse time each 60 minutes in the regeneration/rinse column. In the same plant by simply reducing the basic cycle time to 15 or possibly 12 minutes raw water with a salt content of 6–7 meq/l can be handled without any other change being made. This means that 4–5 resin charges instead of three could be regenerated per hour so that the resin circulation would be higher. On account of the higher interruption time due to the additional resin transfer the gross capacity of the plant would be 3–4% greater, and therefore the net available capacity would be a little smaller as would be expected for 6–7 meq/l salt content. It is possible to operate with a minimum cycle of 12 minutes which means that, depending on the composition of the raw water, the number of resin changes in the regeneration column has to be increased to provide the necessary regeneration and rinsing time. By increasing to 5 cycles per hour a raw water content of 7 meq/l can be demineralised without difficulty. It can be seen that the margin of design for a 5 meq/l plant is such that, by increasing the number of cycles to 4 per hour, a 20% increase can be obtained and with 5 cycles/hr a 45% one.

As has been explained, the salt content of the raw water no longer plays such a decisive role because the process described becomes more attractive to use as the salt content and throughput increase. Servo-Kontimat plants are so designed that 60% of all repair work can be carried out while the plant is operating. By installing a supplementary hand valve, it is possible to carry out all maintenance work with the exception of:

Overhaul of the treatment, backwash and regeneration columns.
Replacement of the nozzles in the treatment column.
Replacement of the ion exchange resin.
Replacement of the inlet and outlet valves on the treatment column.
Cleaning or replacement of the regenerant distributor.

At high overall throughputs two or more lines should be used. Because the plants operate continuously a spare line is not necessary, and so the total capacity is simply cumulative capacity of the lines installed.

As has been shown in FIGS. 1–5, inclusive, there is provided at the junction between the wash-and-regenerating zones of the regenerator column 41 a circulation conduit 18, 63, 64 in which a pressure pump 17 is interposed. This junction is shown in detail in FIGS. 6 and 7. The regenerating chemical fed through tube 46 is impinged upon by a transverse flow of a small amount of water, which occurs in a flange or circular piece designated 60. In a circle-shaped outer flange 61 there is disposed a ring 62, which is connected with a flange through a separating element 65. The inner ring 62 has openings 62a there-through, so that the water entering through conduit 63 through opening 62a flows in the direction of the arrows to the inner space within the ring 62 and leaves through the diametrically opposite opening 62b and conduit 64. A fine screen 66 covering openings 62a and 62b and mounted in the inner lining of ring 62 prevents the discharge of resin. Through this transverse flow the regenerating agent is constantly acted upon throughout the whole diameter of the ring 62. By reason of this motion of the two liquids which impinge upon each other, the regenerator treatment is constantly diluted and simultaneously evenly distributed. Highly concentrated chemicals can be used, for example, 30% hydrochloric acid or 50% soda lye (caustic soda solution).

Figure 8:
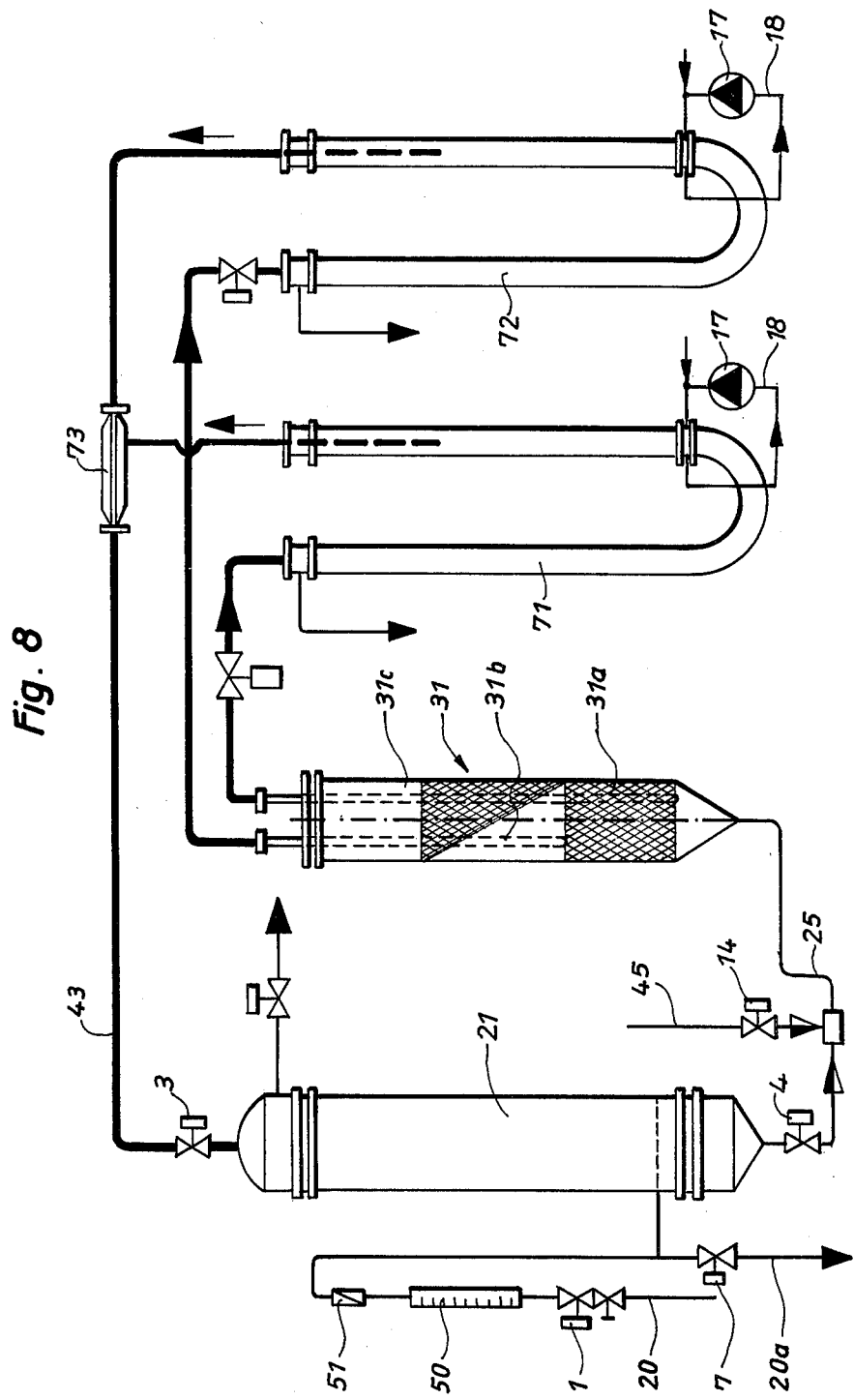
FIG. 8 is a portion of a circuit of the mixing bed according to the invention.

In FIG. 8 there is schematically illustrated a continuously-operating installation in accordance with the invention, such installation operating as a mixed-bed installation. Parts in FIG. 8 which are the same as those in FIGS. 1–7, inclusive, are designated by the same reference characters. In the treatment container 21 of FIG. 8 there is a mixed bed, which is cycle-and-portion-wise moved through a following back-rinse and separating container 131. In this container the resins will be backwashed thoroughly, and they thereby separate according to their specific gravities. The cations will be drawn off by means of an immersion tube 131c in the bottom of the separating container, while the anion-exchanger will be drawn off through an upper immersion tube 131b. The chamber 131a is available as an additional loosening space. As the cations will be regenerated and then washed in a post or after-connected wash and regenerating column 71, the anions will be fed in a corresponding regenerating-and-wash-column 72. These volumns may be of the same construction as those described in connection with FIGS. 6 and 7. After the transporting of resins from the regenerating-and-wash column 71 and 72, the resins will be reunited in a mixer 73 and fed through a conduit 43 to the container 21. The mixing piece is so constructed that the anion and cation charges are intimately mixed and then reach the treatment container as a mixed bed again. Thus installations in accordance with the invention may, without appreciable changes, and with equal advantages, be employed for the preparation of water solutions in a mixed bed with circulation flow.

Figure 9:
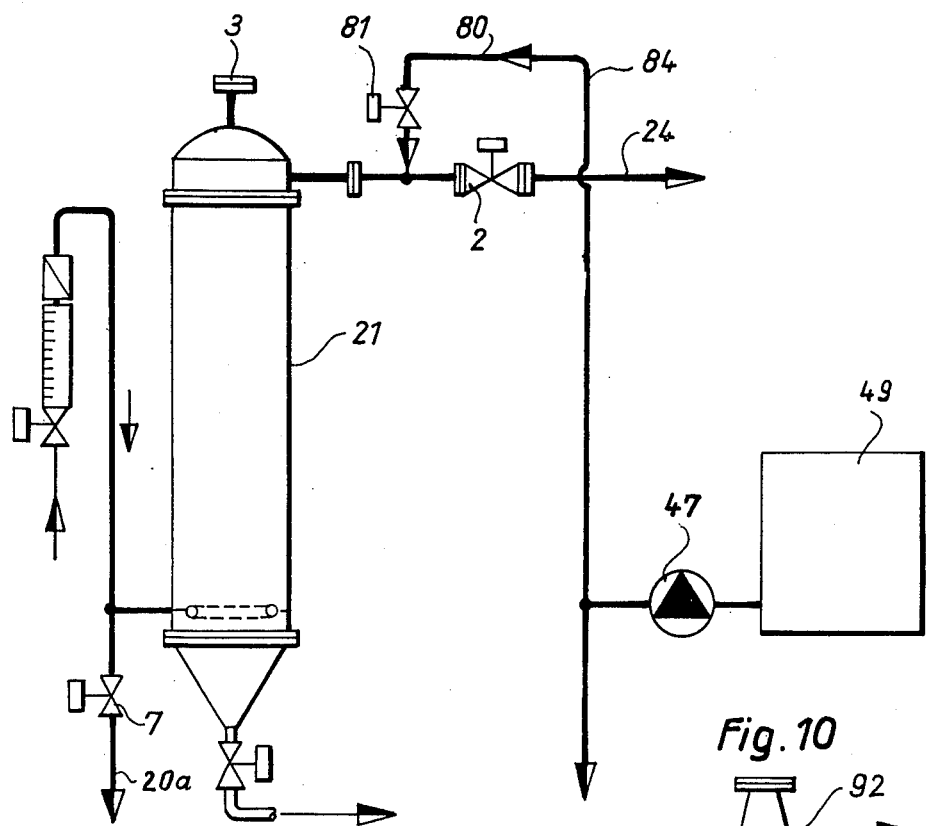
FIG. 9 is a part of the circuit of a so-called "shock rinse installation"

It was shown that with quasi-continuous working installations a significant disturbance may occur, by reason of considerable resistance in the upper distribution system of the treatment container 21 due to pollution by fine grains, for example, abraded pieces of resin and so forth. According to the invention, a so-called shock-rinsing is provided. This occurs during the short interruption phases immediately before the influx of resin through the head of treatment container 21 with a waterflow counter to clean waterflow from top to bottom in the treatment container 21, which results in the elimination of particles of dirt. Such a "shock-rinse-device" is schematically shown in FIG. 9. From the rinse-water tube there is provided a branch tube 80 parallel to the valve 2, to be operated by a valve 81. The water necessary for this operation will be pumped from a clean-water reservoir 49 by means of a pump 47, which also forwards transport water via rinse-and-transport-water tube 84 into the headpiece of container 21 and, with opened valve 7, is drawn off from the bottom of the container 21 via tube 20a. This whole process is finished in a few seconds.

In the system according to FIG. 8 the function of the treatment column is similar to that of the one shown in FIGS. 1 to 5, except that it contains a mixed bed of strong acid cation and strong base anion resin. The backwash column has been modified so that it serves to separate the cation and anion resins as well as for backwashing both of them. The separation is made possible by the difference in density of the resins and by careful design of the dip tubes; it is easier to carry out on small than on large volumes of resin.

For regeneration and rinsing of the cation and anion resins two columns in the form of a 'U' are used. The lighter anion resin is first transferred to the anion regeneration column and then the heavier cation resin to its column. Regeneration is carried out in both columns simultaneously and, after the resins have been rinsed with demineralised water, they are transferred through a specially shaped piece of pipe which serves to mix them intimately to form the mixed cation/anion resin bed in the exchange column. Such modified plants offer special advantages in reduced conductivity and silica content of the product water and in high throughput capacity; these are better than for the plant of FIGS. 1 to 5. This type of plant can serve as either a complete water treatment plant in its own right or for polishing of water from a cation/anion plant, since at least 50% of the resin bed in the exchange column serves as a safety zone.

The conductivity and silica concentration in the product water from a continuous mixed bed plant are a function of operating time. The mixed bed plant was used for complete treatment of raw water containing 4 meq/l of salt and 4 to 5 mg/l of silica. The regenerant used for the cation resin was 150% of the theoretical requirement, and for the anion resin 160%. The rinse water consumption was 3 l/l of cation resin and 5 l/l of anion resin.

Such a mixed bed plant functions very well in conjunction with the plant described with reference to FIGS. 1 to 5 containing a weak acid resin followed by an intermediate carbon dioxide spray degaser. For certain water compositions this is an economical arrangement because the excess of acid from the mixed bed regeneration can be used for the weak acid resin. The degree of purity of the product water could be significantly higher than when a mixed bed plant is used on its own.

Although not directly connected with ion exchangers, gravel and sand filters are often used with them. These filter can be conveniently used in front of either of the plants described above since no supplementary automatic control system is needed. The filter and backwash columns operate similarly to those used in the first described process. The material used is either an active or inert ion exchange resin or some other plastic material. The cycle can be initiated by a timer, by the pressure drop across the filter or by a turbidity meter. During backwashing only one charge is in the backwash column, so that at least 100% free board is available; a fungicide can be used if necessary.

This type of process makes it possible to avoid contamination of the filter materials by dirt, fungi, etc.

The reduction of suspended solids is function of the linear velocity in the filter. By using a filter aid such as carbon or kieselgur, either put directly on the filter material or in the raw water storage tank, the degree of filtration can be significantly improved. In this type of filter absorbtion can be carried out as well as filtration. In a test plant an iron hydroxide suspension which was partly colloidal was used because it was known to be difficult to filter. The curves shows that the efficiency of solids removal can be improved from 60 to 90% by using filter aids.

This type of filter should be suitable for use in cooling and condensate systems as well as for demineralisation plants. For this purpose the simple automatic control, high filter velocity, high capacity for removal of dirt and small, but continuous, stream of effluent water would be advantages, particularly in starting up condensate treatment plants.

Figure 10:
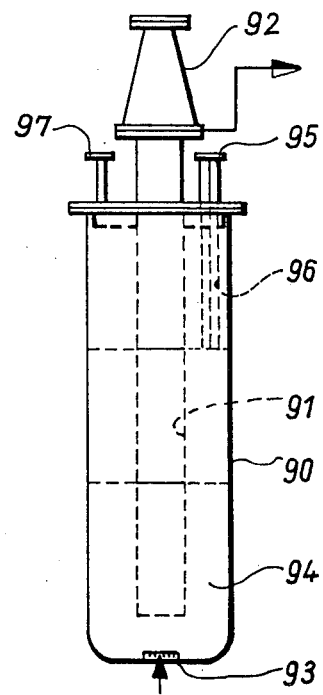
FIG. 10 is a view in side elevation of a modified arrangement of a back-rinse regenerator-and-wash-column.
Figure 11:
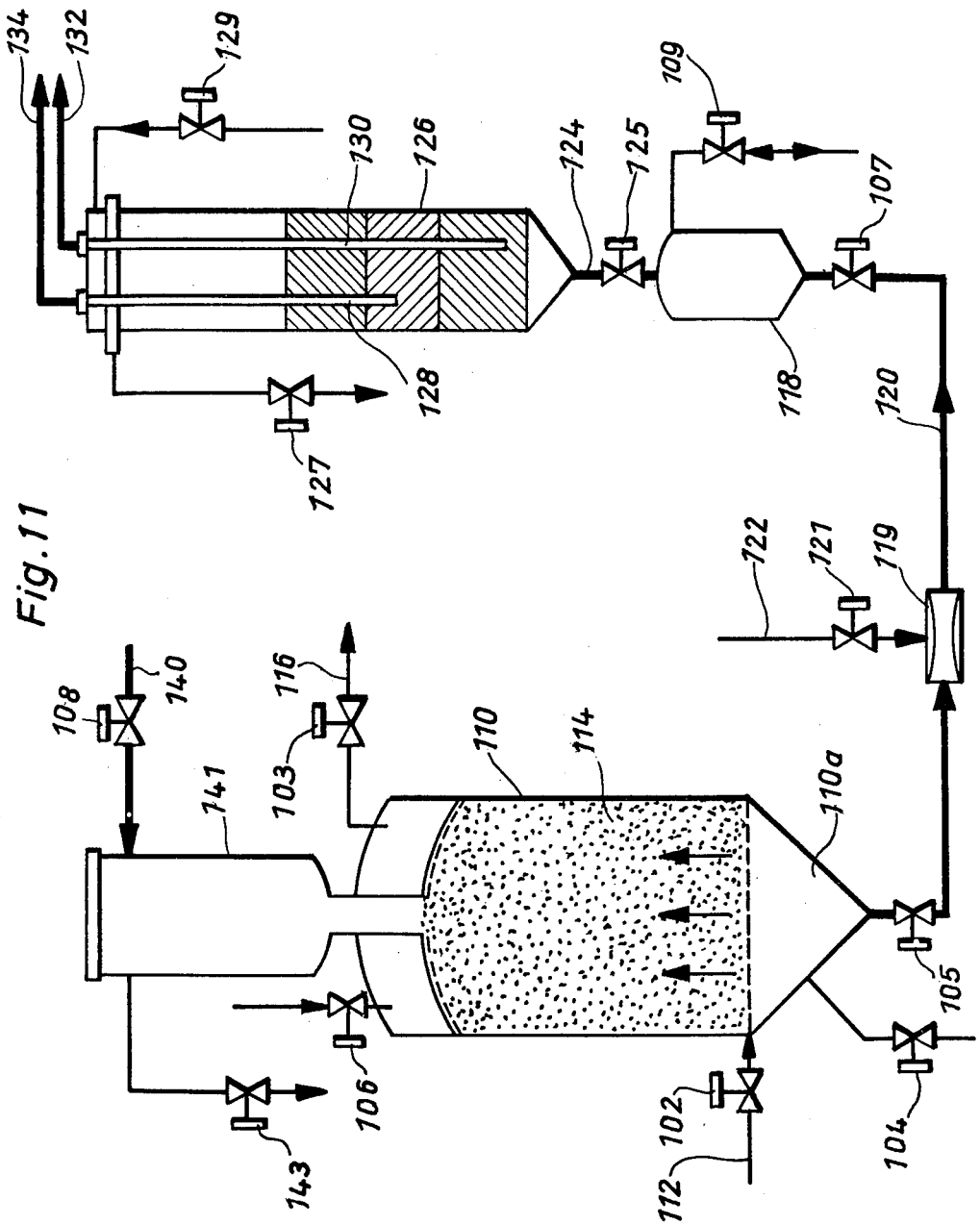
FIG. 11 is a similar view to that of FIG. 8 showing in addition a mixing and post washing column and an intermediate container.

In FIG. 10, there is shown an embodiment of a back-rinse, and a regenerating-and-wash column in a single unit construction. In a circular cylindrical container 90 there is centrally disposed in an axial direction a column 91. The back-rinse process takes place in the latter, whereby the resin is fed through an intake funnel 91. After the inflow of the regenerating agent via an opening 93 provided on the bottom of the container 90, the resins will be regenerated and forwarded in the space 94 between the inner column 91 and the outer container 90. The resin is drawn off through an immersion tube 95 from which it flows to a discharge conduit 95. The rinse-and-transport water is led through conduit 97 into the container 90. The diameter of the column 91 is generally the same as the radial distance between the confronting walls of the column 91 and the container 90. This embodiment has the advantage that it considerably reduces the space required by the back-rinse, regenerating, and wash-column portions of the installation.

The raw material which, for the sake of simplicity, will hereinafter be called untreated water, and which is to be purified is introduced via line 112 into the lower region of a treatment container column 110, with a valve 102 opened. The untreated water flows through the treatment column from bottom to top and is withdrawn via pure water conduit 116, with a valve 103 open. The ion exchanger resin is present in the treatment column as mixed bed 114. For the purpose of transport of loaded exchanger resin the resin bed is lowered, with a valve 104 opened and valve 106 open and the valves 102 and 103 shut, into the funnel-shaped bottom portion 110a of the treatment column 110. The resin charge present in the funnel 110a is conveyed into an intermediate container 118 serving as proportioning or measuring column by opening valves 102, 105, 107 and 109, valve 103 also being open. It is possible to introduce into the measuring column 118, optionally via an ejector 119, wash and transport water, through the line 122 via the valve 121 into the line 120. This ejector can be used for admixing chemicals which improve the separation of the mixed resins in the connected back-rinse and separation column 126. The ion exchanger mass, which is still mixed, passes batchwise from the proportioning column 118 via a conduit 124, with valves 125, 109 and 127 open, into a separation and back-rinse column 126. From the head piece of this column 126 two drainage pipes 128 and 130 project to different depths of submersion into the column space. The drainage pipe 128 which opens at a higher level is intended for drawing off cation resin.

During the transport of the resins from the measuring column 118 into the separation and back-rinse column 126 the anion exchanger resin of lighter specific gravity is already separated from the cation resin which is of heavier specific gravity, the anion exchanger resin depositing at the top and the cation exchanger resin thereunder. Between the two there is formed a separation zone which is more or less pronounced depending on the kind and granulation of the resins, the loading condition and the operating time. Apart from their being separated the resins are back-rinsed and thereby freed from contaminations as a result of the through-flow of transport water which drains away via valve 127.

The separation and back-rinse column 126 is so arranged that several charges of cation and anion exchanger resin can be accomodated therein. After the separation and sedimentation of the two resin charges anion exchanger resin is present in the region of the mouth of the pipe 128 while in the region of the drainage pipe 130 which opens at a lower level cation exchanger resin has deposited.

By opening the valve 129 water under pressure is fed into the back-rinse and separation column and a charge of cation exchanger resin is drained, via the conduit 132, into the downstream connected regenerating and wash column which is not shown in detail. The level of the cation exchanger resin is thereby lowered corresponding to the amount of resin which has been removed and the level of the anion exchanger resin layer above the mouth of the drainage pipe 128 of the anion exchanger resin falls to such an extent that it is ensured that only anion exchanger resin is discharged. The additional amount of resin which is still within the separation column, in addition to the discharged quantity of resin, can be described as safety quantity and the filling level formed thereby as safety zone.

By virtue of this safety zone it is ensured that the drainage pipes for the different types of resin never reach into a mixed zone which may be present and mixed resin is thus drained off. The height of the safety zone, which depends on the type of resin, the mixing ratio of the resins, the loading condition and the distribution of granule sizes, should at least correspond to one charge of resin mixture.

Advantageous results have been found when the separation and back-rinse column is so dimensioned that the capacity of the back-rinse and separation column corresponds to at least 10 charge volumes and the ion exchanger mass contained therein amounts to 5 charge volumes of which at any time 1 charge of a kind of the ion exchanger resins (cations or anions) is present in the region of the mouth of the drainage pipes, while a quantity of about 3 cycles is present therebetween. With such dimensioning adequate space for back-rinsing is available while on the other hand clean separation of the mixed bed into anions on the one hand and cations on the other hand is also ensured.

While the cation exchanger resin is fed to a preferably U-shaped, regeneration and wash column via the line 132, the anion exchanger resins pass via the line 134 into a wash and regeneration column of similar configuration.

After the separate washing and purification the anion and cation exchanger resins are conducted into a common line 140, with the valve 108 opened, to a mixing and post-wash column 141 which is disposed above the operating column 110, the valve 4 being open for the purpose of removing the transport water. Freshly regenerated resin corresponding to the resin charge introduced into the container 141 is displaced from the container 141 into the operation column 110.

During this transport stage the container 141 serves for finally mixing the two resins. With the valves 102 and 103 open, i.e. with the treatment column 110 in its operational state, and valve 143 open, de-ionate from the treated water zone of the treatment column 110 flows through the container 141 and flows out via the valve 143, the resin contained in the container 141 thereby being washed. This post-washing of the mixed resins occurs without additional pressure increasing or shut-off elements. The last described post-washing process has for the process technology of the mixed bed filter the advantage that regeneration chemicals which are still present, from the regeneration columns, in the mixed resin are totally washed out in the column 141. This measure is of particular advantage when the mixed bed is used as a policing filter, whereby it is necessary to regenerate it with greater excess of regenerating agents than is normally necessary when the mixed bed filter is used as working filter. This post-washing of the mixed resins occurs without additional pressure raising or shut-off means. Consequently the risk of the resins which have already left the regeneration column still containing regeneration agents is greater than when the installation operates as a working mixed bed filter.

It is apparent that a high degree of purity of the water to be treated can be achieved with the described installation. The freshly regenerated resin is introduced in the region of the outlet of the treated water so that this water passes through a zone of freshly regenerated exchanger mass in the upper region of the treatment column. These ion exchanger masses exhibit no excess of regenerating agents or loaded ions since they have been perfectly regenerated, washed and additionally post-washed after having been absolutely separated in the separation column.

The above-described installations may be employed in a variety of manners:

For the entire desalination of water, in combination with a carbonic acid scrubber, weak and strong acid cation-exchangers and weak or strong basic anion-exchangers, as a water softener whereby a regenerated exchange column functions as a neutral exchanger with salt spring water, for decarbonization with eventually post-coupled carbonic acid degasing scrubber, for treatment of surface water by means of absorbing resin, as protection of post-coupled complete desalination installations against humic acids, for treatment of metallic salt solutions of all kinds, for treatment and cleaning of chromium acid baths, paladium baths, acid coating baths, for the recovery of noble metals, for the treatment of galvanic rinse water, for the circulation as well as a flow-through unpoisioning and neutralization treatment, as a tenside-exchanger for the removal of non-ionic tensides in water solutions, as a selective-exchanger for the removal of leftover metal traces from fresh and waste water, for the treatment of whey, for the treatment and removal of radioactive agents from fresh and waste water.

This installation takes substantially less space than the ones employing conventional ion-exchange columns. There now follows a comparison:

EXAMPLE

Based upon a content of 3 mval/l of salt, an output of 30 cbm/h, and a usable volume capacity/l exchange agent of 1 mval.

With the conventional column process a volume of ion-exchange masses of 4.220 l is needed.

With the described continuously working installation: 850 l. are required.

Space required for conventional installation;
40 qm surface area
4 m height
160 cbm constructed room.

The process of the present invention has the following requirements:
17 qm surface area
4 m height
68 cmb constructed room.

By means of the described optimal exploitation of the regenerating chemicals, there is present a small counter-ion effect so that a degree of purity can be attained which is not possible with conventional installations.

When connecting a strongly acid cation-exchange-carbon acid scrubber to a strongly basic anion-exchanger, the following degrees of purity of the processed water were obtained:
efficiency — $1/\rho S$
sodium content — 1 mg/l
silicic acid content — 0.1 mg/l With the conventional process this degree of purity can be reached only in a mixing bed.

Since the transporting intervals with the described process are large, contrary to those of the low. At a cycle time of 15 minutes there are required only 96 unloads and loads of the exchange agents within a working time of 24 hours. Consequently, less of the resin is lost in the method and apparatus of the present invention as compared to prior continuously working installations which have a cycle time of about 3 minutes and consequently have about 500 load changes within 24 hours.

Figure 12:
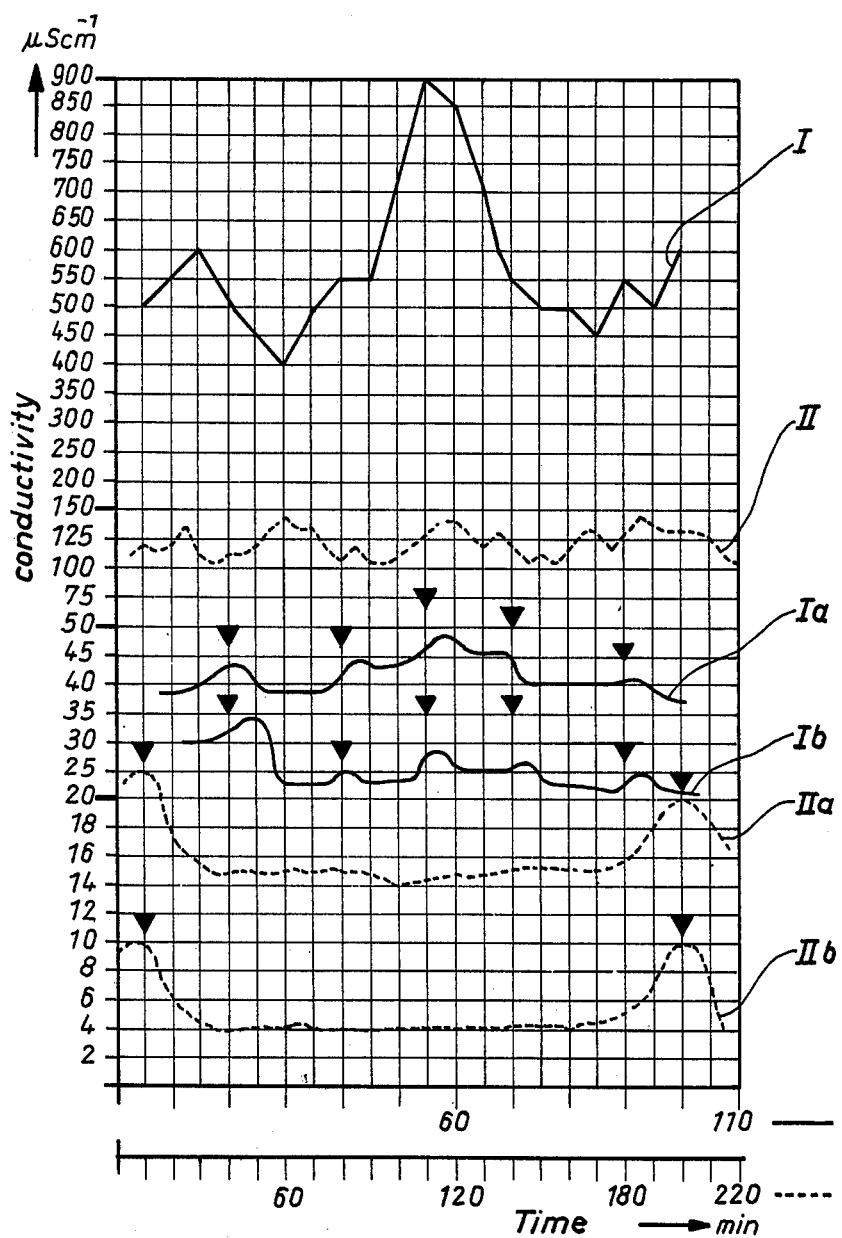
FIG. 12 is a graph illustrating measurements obtained during use of the ion exchanger in a galvanising plant.

Referring now to FIG. 12 there is shown the results of measurements which were obtained during use of the described ion exchanger plant in a galvanising establishment. On the ordinate, the conductivity of water is expressed in $\mu S/cm$ (Micro-Siements), differenting scales along the ordinate having been chosen for the simplifying the illustration. For example up to 20 $\mu S/cm$ the distance between two divisions of the graph is 2 $\mu S/cm$, from 20 to 50 $\mu S/cm$ the distance between the divisions is respectively 5 $\mu S/cm$, whilst from 50 to 150 $\mu S/cm$ this distance is respectively 25 $\mu S/cm$ and from 150 $\mu S/cm$ onwards the distance between two divisions is respectively 50 $\mu S/cm$.

On the abscissa, the time from 0 to 110 minutes is shown for the curves drawn in solid lines and a time from 0 to 220 minutes is shown which relates to the operation of the ion exchanger plant, the corresponding curves being shown in broken lines. The solid triangular points on the graph show respectively the commencement of the draining of the resin charge from the treatment container or respectively the commencement of the transportation of the ion exchanger charge in the backwashing column and the regenerating and washing column. The distance between two black triangles represents the cyclic time. The arrangement of the ion exchanger plant is that a highly acid cation exchanger was used, followed by a slightly alkaline anion exchanger.

In the following, the solid curve lines are compared with one another and the dotted curve lines are compared with one another independently of the solid lines. The conductivity of the untreated water should be compared with that of the desalted water (pure water), a regenerating agent quantity of 150% of the theoretical amount of hydrochloric acid and 130% of the theoretical amount of sodium hydroxide solution having been used during the first test for the regeneration of the ion exchanger compound and 120% of the theoretical amount of hydrochloric acid and 105% of the theoretical amount hydroxide solution having been used during the second test. There emerges the following picture:

The solid curve I shows untreated water which has an extremely high salt content and the conductivity of which fluctuates between 400 to 900 $\mu S/cm$. In the case of the measurements shown, these high salt contents were artificially produced by adding electrolytes to the flushing baths. The conductivity values of the processed pure water emerge from curves I$a$ and I$b$. In the case I$a$, the ion exchanger compound was regenerated with 120% of the theoretical amount, of hydrochloric acid (HCL) or respectively 105% of the theoretical amount of sodium hydroxide solution (NaOH). The conductivity values of the pure water fluctuate between 37 to 48 μS/cm. The cyclic times are approximately 20 minutes. If, on the other hand, the ion exchanger compound is regenerated with 150% of HCL and 130% of NaOH, the untreated water being the same (curve Ib), then a maximum conductivity comes about at 33 μS/cm and a minimum at 22 μS/cm.

In the case II, in which the lines are broken, the conductivity of the untreated water has been measured over a period of 220 minutes. Here, the conductivity values of the untreated water fluctuate only between appr. 100 to 150 μS/cm. When treating the ion exchanger compound with 120% HCL and 105% NaOH, a pure water comes about which has a maximum conductivity of 25 μS/cm and a minimum conductivity of appr. 14 μS/cm. If, on the other hand, a regenerating agent of 150% HCL and 130% NaOH is used, the minimum conductivity maximum is approximately 10 μS/cm, and this is so whenever the cycle starts. The cycle interval is, in this case, approximately 190 minutes. It is evident that the cyclic time is automatically substantially reduced, when the degree of pollution of the untreated water is higher and almost uniform qualities of the pure water are produced. If the salt content of the untreated water is reduced, then the cyclic intervals are prolonged automatically.

The advantages of the process according to the above application will be summarized hereinater:

(a) the cycle sequence of the plant is adapted automatically, even when the salt content fluctuations in the untreated water are extremely high, in such a way that with high salt content fluctuations the cyclic intervals are smaller than they are with a low salt content;

(b) a minimal influence on the remaining conductivity of the desalted water by the salt content of the untreated water. The high fluctuations in the untreated water are virtually unreflected in the pure water. The conductivity of the pure water is virtually constant, irrespective of the salt content of the untreated water. When the salt content fluctuations are high, the quantity of resin transported per unit of time is increased by a reduction of the cyclic intervals. The loading condition of the ion exchanger compound in the operating vessel is influenced to a comparatively small degree; this is in contrast with conventional plants, in which high salt contents can lead to a break-through of the ion exchangers. Due to the continuously fed, freshly regenerated resin batches, the loading zone in the treatment column is only slightly changed.

(c) The degree of purity achieved with the plant according to this application is more favourable than it is in conventional ion exchanger-desalting plants. Whilst in conventional plants a residual conductivity of only approximately 30 to 50 μS/cm can be achieved, the quasi-continuously working plant according to the application achieves a conductivity minimum of less than 10 μS/cm, in other words purity values which are close to the theoretical limit.

The development of continuous ion exchange systems is dependent on the development of suitable ion exchange resins. Despite being conceived in such a way as to protect the resins (long cycle times, valves which do not shut against the resin, resin transfer without pumps, jet vaccum pumps, etc.), the conventional resins are not suitable for the above described plants.

The following properties of ion exchange materials are especially important:
Mechanical strength,
Resistance against attrition and wear (mechanical and chemical),
Resistance against osmotic shock,
Suitable granule size distribution,
High ion exchange rate,
Easy regeneration,
Adequate useful capacity.

These physical properties are significant because in this type of plant the transfer of resins involves movement through valves and pipes, and they are subjected to sudden changes in pressure; therefore, the formation of fine particles must be avoided as far as possible. The particle size must be carefully chosen, and should lie on average between 0.5 and 0.8 mm to avoid channelling in the treatment container which causes the saturation front to be distributed over a considerable bed height. In addition the presence of large particles must be avoided because they would settle out in the transfer lines.

For continuous plants, the resins used should be hard and elastic and should be resistant against the effect of osmotic shock. The physical stability of the resin can be improved by higher cross-linking of the polymer matrix but this has the disadvantage, particularly for continuous processes, that the ion exchange rate and total capacity are rapidly reduced. Although less cross linked resins have higher ion exchange rates and total capacities they have less physical resistance and large changes in volume between the saturated and unsaturated states. The best material for continuous ion exchange processes strikes an optimum degree of cross-linking to give good physical stability without loss of exchange rate, total capacity and porosity. A compromise must be chosen between the high cross-linking with the usual disadvantages in exchange rate and capacity and the low crosslinking with the disadvantages of high swelling and low physical stability.

Since linear velocities through the ion exchange beds of up to 100 m/hr can be used, the behaviour of the different types of ion exchangers must be considered in the light of ion exchange rate, working rates and throughputs, depending on the height of the saturated zone in the bed.

However, one is not free, for convenience in the plant constriction or any other reason, to increase the working velocity and at the same time reduce the bed height to give high throughputs without excessive differential pressures across the bed.

For strong acid cation exchangers it is necessary, in order to produce good water quality in respect of sodium leakage, that the specific flow rate and corresponding linear bed velocity is restricted to the range of 40 – 60 m/hr for a bed height of 70 cm. Higher working and bed velocities involve an increase in bed height of 70 cm. Higher working and bed velocities involve an increase in bed height to 120 cm or above to maintain an acceptable water quality.

Weak base ion exchangers have undesirable properties for continuous processes above 40 m/hr specific flow rates and linear bed velocities, a minimum bed height of 78 cm is necessary. If the specific flow rate and linear velocities have to be higher than that, exchanger bed heights must be more than 1m. Strongly basic ion exchangers have better properties, measured in terms of silica leakage, working and bed velocities from 60 – 100 m/hr give acceptable water quality with a bed height of 38 cm which does not, however, allow the bed height to be reduced to below 80 cm for practical reasons. These values show that the plants described are laid out with particularly large safety margins for the quality of the treated water. Bed heights of 100–140 cms allow good water quality to be achieved, especially for continuous processes.

To achieve silica values of less than 20 g/kg (the normal standard for power station boilers) at specific flow rates and linear velocities of 40 m/hr and more, bed heights of greater than 1m are necessary. Below are listed some theoretical considerations concerning the phenomena which occur in an ion exchange column. The ion exchange process can be divided into five stages:

1. diffusion of the ions from the aqueous solution to the surface of the resin particle,
2. diffusion within the particle to the resin exchange sites,
3. the actual exchange between the ions from the aqueous solution and those of the resin,
4. diffusion of the counter-ions from the inside of the particle to the surface,
5. diffusion of the counter-ions from the particle surface into the body of the aqueous solution.

The significance of the internal and external diffusion rates on the rate of ion exchange can be illustrated more concretely as follows:

1. in solutions with a concentration of the above, say, 2,300 mg Na/l (100 meq/l) the ion exchange rate limited by the internal diffusion rate.
2. for concentrations of below, say, 23 mg Na/l the external diffusion rate is the limiting factor,
3. for the concentration ranges of 2,300 to 23 mg Na/l the ion exchange rate depends on both external and internal diffusion rate. For raw water which first comes into contact with the ion exchange bed the internal diffusion is the determining factor because the resin is nearly saturated.

The solution being treated as it passes through the resin bed becomes weaker and weaker so that in the part of the resin bed where only the leakage should be taken up the external diffusion rate limits the exchange process. From fluid mechanics it is known that the flow round a solid body, for example a grain of ion exchange resin, has a laminar layer around it which restricts mass transfer. This means that in the polishing zone a higher velocity tends to improve the ion exchange rate.

This means that it would be an advantage to design the ion exchange column to have such a shape that the velocity of the solution flowing through it is increased in proportion to diminishing salt concentration, thus taking into account the change from internal to external diffusion controlling the exchange rate. In fact, in Servo-Kontimat plants the exchange column is conical in the polishing zone so that it does take into account this effect.

The considerations mentioned above are of special importance to the short cycle process with limited operating times, because these plants do not have a safety zone in the exchanger bed.

Considering the characteristics of the resins, the process described adapts easily to changes in the salt content and composition of the raw water. As the salt content of the raw water goes up the cycle frequency is increased; this happens automatically if the cycles are initiated when the resin at the middle of the bed is saturated, as can be seen from the curves for water with two different salt contents. The greater the cycle frequency the greater the regeneration frequency, and the higher the acid concentration in the spent liquors from the cation regeneration column. The prime effect of changes in salt concentrations is to alter the rate of resin circulation, this automatically causes corresponding changes in consumption of regenerants and plant water.

The conductivity of the demineralised water can, within certain limits, practically be controlled to any value required by altering the amount of surplus regenerant. By reducing the quantity of hydrochloric acid from 150% to 140% and then 120% of the theoretical requirement, the corresponding values of the conductivity of the demineralised water would be 2 $\mu$mhos/cm, 3 $\mu$mhos/cm and 5 $\mu$mhos/cm. In this test, when the anion exchanger resin was regenerated with 140% of the theoretrical acid requirement 2.5 l water/l. cation resin were required and 4.5 l water/l. anion resin.

The purity of the demineralised water is very dependent on the useful capacity of the resin as fixed by the cycle frequency, the surplus of regenerants for both the cation and anion resins and the amount of rinse water. It is also, to a small extent, influenced by the linear velocity and the specific flow rate of the exchange column.

The removal of organic substances in the raw water, measured by potassium pemanganate consumption, is a function of the surplus of regenerant liquors in % of the theoretical requirement for a strong base anion exchanger. It can be seen that for a regenerant consumption of 175% of theoretical the organic and subsequent desorption into the regeneration liquors. As the regenerant quantity is reduced to 130% of theoretical this value decreases relatively slowly to about 49% but with further reduction the quantity of organic materials removed drops rapidly until at 120% of the theoretical quantity only 18% is removed. This means that as the quantity of regenerant used approaches the theoretical amount less and less of the organic materials are removed during the regeneration, and the capacity of the resin for absorbing these materials also progressively decreases; sites in the resin are gradually blocked, and the total capacity reduced.

In order to establish the optimum quantity of rinse water for any individual operating requirement the conductivity of the demineralised product water should be measured every two to three minutes during 30 minutes from the start of a new cycle. In order for the conductivity of the product water not to exceed 5 $\mu$mhos/cm, 2.5 l. rinse water/l. cation resin and 4.5 l/rinse water/l. anion resin are sufficient. For test purposes it was assumed that the quantity of regenerant would not exceed the normal operating range of 130 to 140% of the theoretical requirement for the anion exchanger. The use of a very high regenerant surplus on the cation resin, say, 200% of the theoretical requirement, has no significant effect on the conductivity of the product water, because even if the cation resin is not well rinsed the acids are removed by the anion resin. For this reason the conductivity of the product water primarily depends on the amount of surplus regenerant used for the anion resin. The amount of surplus regenerant is checked by titration of the spent liquors from the anion and cation exchangers with 0.1N hydrochloric acid or caustic soda respectively; these measurements give a good indication of the degree of loading of the resins and hence the amount of rinse water needed.

In the continuous process the surplus of regenerants is a function of the useful capacity of the resins. The cycle, initiated from measurement of the spent liquors, lasted 26 minutes. It can be seen that, for the same quantity of caustic soda (32 g/l. resin), as the loading of the resin increases (increasing useful capacity) the curve of regenerant surplus as a function of running time becomes flatter and flatter. The excesses of acid and alkali in the spent liquors show whether the quantities of regenerants which were used were sufficient for the desired useful capacity. The curve also shows that for greater useful capacities when insufficient excess regenerant is used the amount of it in the spent liquors stays at a low level, whereas for well regenerated resins the acid or alkali surplus falls from a high initial value (due to liquor left from the previous cycle) to almost nothing and then climbs again to the original level.

For the plant described it is evident that a small, but optimum, flow of rinse water used over a longer time is more effective than a large flow for a short time, in terms of the quantity of rinse water required.

As already mentioned, the ion exchange resins are required to function under rather extreme conditions in the above described systems. The quantity of resin fines lost in the treated water and backwash water from a strong acid cation and a strong base anion exchanger as a function of the plant running time and cycle frequency. Since considerably less resin is required for a continuous plant than for a batch one, the attrition of the resin, in absolute terms, is not higher than for a conventional process. For example, for a manually operated ion exchange plant operating for a cycle time of 24 hours with 60 m3/hr throughput and 2 meq/l salt concentration 6,100 l of anion resin would be needed. If it is assumed that, for a conventional plant 5% a year of the anion resin is used up this makes 305 l in all. For the same raw water composition and throughput, from the 1,800 l of anion resin in a Servo-Kontimat plant this loss represents 17% a year. In fact, the guaranteed resin attrition for the cation and anion exchangers in the above described plant is significantly less than this figure. In calculating the data it has been assumed that the plant operates 16 hours per day so as to make 8,000 operating hours in two years, which corresponds to the guaranteed running period according to the V.G.B. (Association of Owners of Large Boilers) water water treatment plants. After two years the resin attrition for an anion exchanger would be 5% at 1 cycle/hr, 10.2% at 2 cycles/hr, 16% at 3 cycles/hr and 22% at 4 cycles/hr. These values are, in any case, well within the resin attrition normally allowed under the guarantee for conventional demineralisation plants, particularly for strong acid cation exchangers. The pressure drops in both types of treatment columns were measured during 8,000 operating cycles; at first the pressure drop rose fairly quickly until 3,000 cycles had been run, and then the curve flattened out and became particularly constant. It can be seen, therefore, that initially the proportion of fine particles increased, and then a balance was reached in which the rate of generation of fines was equal to the rate of washing out so that the pressure drop levelled out. These curves also show that the shock rinse device, which cleans the nozzles in the plate at the top of the treatment column, fulfills its function and prevents blockage by fines, if this had not been so the pressure drop across the treatment column would have continued to climb.

Although the invention is illustrated and described with reference to a plurality of preferred embodiments thereof, it is to be expressly understood that it is in no way limited to the disclosure of such plurality of embodiments, but is capable of numerous modifications within the scope of the appended claims.

I claim:

1. In a process for the treatment of water including cyclic operation of an ion exchange mixed bed system wherein a mixture of anion and cation exchange material through which untreated water is arranged to flow in a treatment container is cyclically fed in charges from the bottom of the treatment container to a back-rinsing and separation column, the volume of the said charges is set in a measuring column connected to the output of the treatment container and the input of the back-rinsing and separation column, the mixed anion and cation exchange material is separated in the said back-rinsing and separation column such that an anion exchange mass is disposed in a region above a region containing a cation exchange mass with a further intermediate region containing a mixture of anion and cation exchange material between the upper and lower region, anion and cation exchange charges are separately drawn off from the upper and lower regions in the back rinsing and separation column, the charges being fed into separate regeneration and wash columns and thence returned into the treatment container the improvement which consists in that chemicals capable of assisting in the separation of cation and anion exchange masses are admixed and introduced into the system ejector by means of an disposed between the treatment container and the measuring column.

* * * * *